March 11, 1924.
C. W. CORL
STOCK FEEDER
Filed Oct. 25, 1922    2 Sheets-Sheet 1
1,486,733
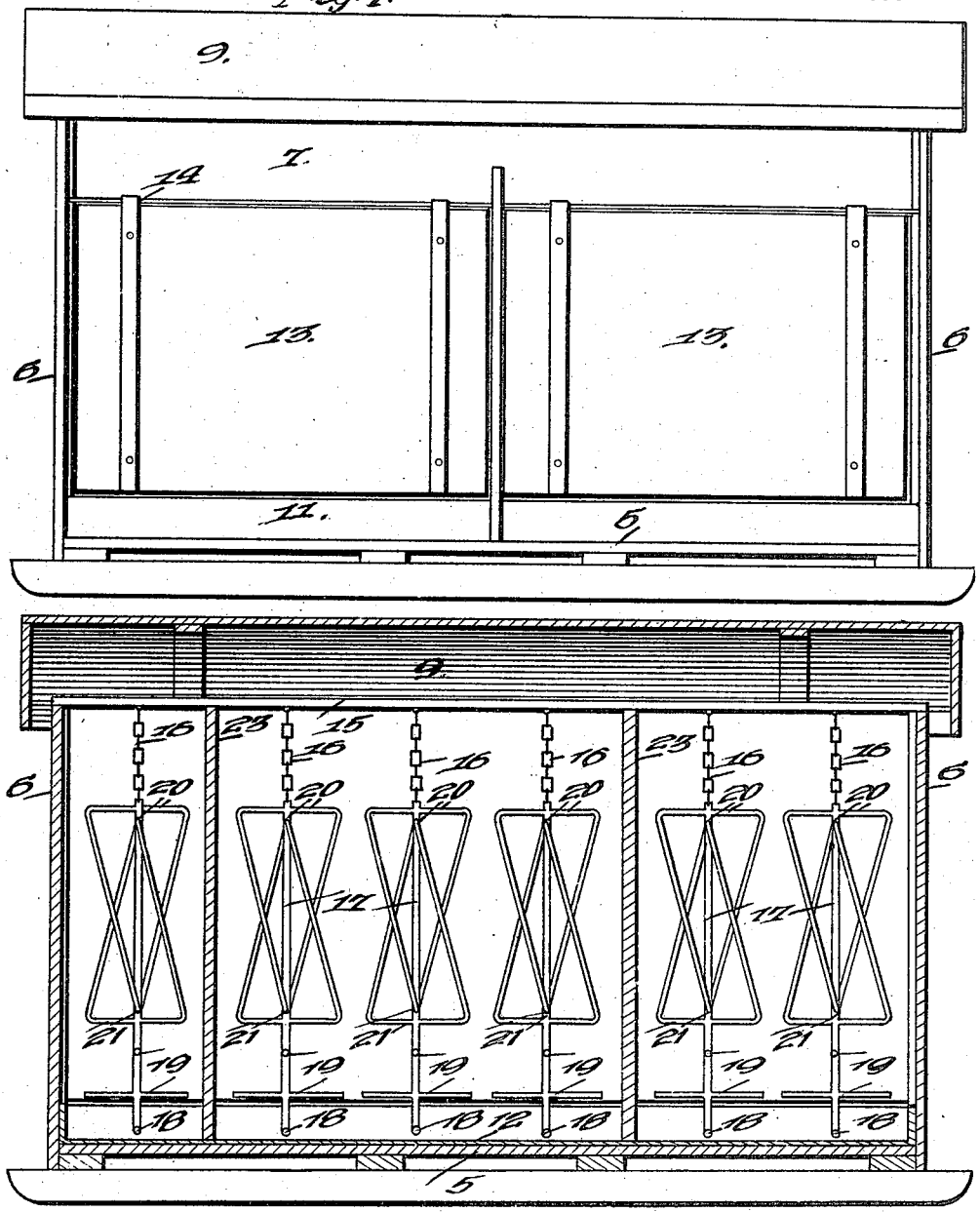

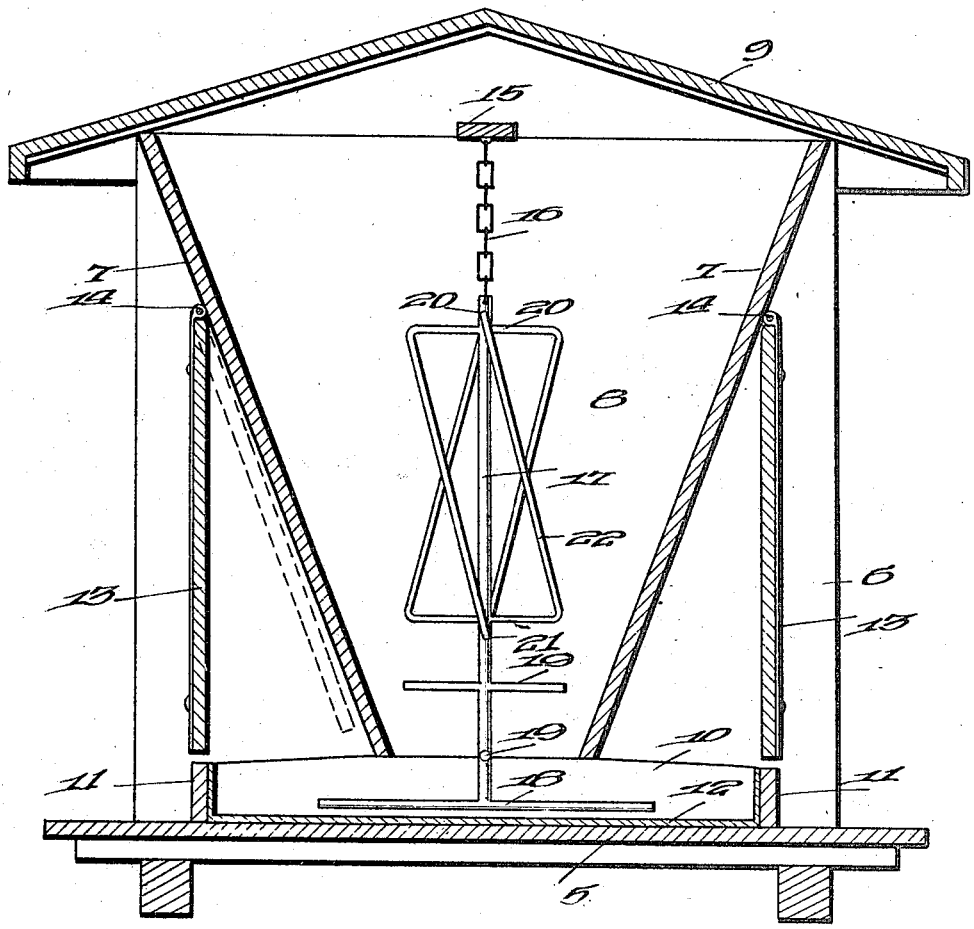

Patented Mar. 11, 1924.

1,486,733

UNITED STATES PATENT OFFICE.

CHARLES W. CORL, OF STATE COLLEGE, PENNSYLVANIA.

STOCK FEEDER.

Application filed October 25, 1922. Serial No. 596,846.

*To all whom it may concern:*

Be it known that I, CHARLES W. CORL, a citizen of the United States, residing at State College, in the county of Center and State of Pennsylvania, have invented certain new and useful Improvements in Stock Feeders, of which the following is a specification.

The present invention relates particularly to means for feeding hogs, the object being to provide a novel structure of a simple and effective character, in which the feed in the hopper or container will be agitated, and thus caused to gravitate to the feeding trough.

The preferred embodiment of the invention is illustrated in the accompanying drawings, wherein:—

Figure 1 is a side elevation of the feeder,
Figure 2 is a longitudinal sectional view therethrough,
Figure 3 is a cross sectional view,
Figure 4 is a detail perspective view of one of the agitators.

In the embodiment disclosed, a base or floor 5 is provided on which are supported end walls 6 carrying between them downwardly convergent side walls 7 that terminate short of the floor or bottom 5 and form a hopper 8. A removable cover 9 is mounted upon this structure. A trough 10 is formed by the bottom 5 and narrow side walls 11 located on said bottom 5 outside the lower ends of the hopper walls 7 and between the end walls 6. Preferably this hopper is lined with metal, as illustrated at 12. Gates 13, loosely hung at the top as shown at 14, normally extend from the upper edges of the trough walls 11 to the hopper walls 7, but are capable of being pushed inwardly by the animals as indicated in dotted lines in Figure 3.

Extending centrally and longitudinally of the upper end of the hopper 8 is a bar 15, from which hang a number of chains 16 supporting a plurality of vertical shafts 17. The chains, as shown, are connected to the upper ends of said shafts. The lower ends of the shafts extend into the trough 10, but are spaced from the bottom thereof and carry actuating cross bars 18 that project beyond the lower ends of the side walls 7 and are also spaced from the bottom of the trough. Right angularly disposed agitator fingers 19 are carried by the shaft 17 and are located in the lower end of the hopper. Above these agitator fingers are upper sets of right angularly disposed cross bars 20 and lower sets of right angularly disposed cross bars 21. These bars are connected by inclined rod sections 22, each rod section extending from the upper of one of the cross bars 20 to a right angularly disposed lower cross bar 21, preferably the same being formed of looped rods or wires, as will be clear by reference to Figure 4.

If desired the interior of the hopper may be divided into compartments by transverse partitions 23, each compartment containing one or more of the agitator members.

In the use of this device the feed is placed in the hopper 7 and the hogs or other animals in obtaining the feed, press the gates 13 inwardly. In their endeavors to obtain the feed they will root along the hopper, thereby pushing upon the actuating rods 18 and causing the turning and swinging movements of the shafts 17. This obviously will effect through the fingers 19 and stirrers 20—22 the agitation of the feed, causing it to gravitate down into the trough where it becomes accessible to the animals.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus fully described my invention, what I claim as new and desire to secure by Letters Patent, is:—

1. In a feeder, the combination with a trough and a hopper delivering thereinto, of an upright shaft in the hopper having actuating means in the trough, upper and lower cross arms respectively projecting from different sides of the shaft within the upper and lower portions of the hopper, diagonally disposed rod portions connecting said upper and lower cross arms, and outstanding agitator fingers carried by the shaft below the lower cross arms and located in the lower end of the hopper adjacent to its outlet into the trough.

2. In a feeder, the combination with a trough and a hopper delivering thereinto, of an upright shaft in the hopper having actuating means in the trough, and agitating means on the shaft consisting of upper cross arms projecting from different sides of the shaft, lower cross arms also projecting from different sides of the shaft and diagonal rod portions connecting differently disposed upper and lower cross arms.

In testimony whereof, I affix my signature in the presence of two witnesses.

CHAS. W. CORL.

Witnesses:
   JOHN L. HOLMES,
   VIRGINIA H. DORWARD.